United States Patent [19]
Fray et al.

[11] 4,166,013
[45] Aug. 28, 1979

[54] METHOD OF MAKING METAL BETA-ALUMINA AND REFINING METAL USING IT

[75] Inventors: Derek J. Fray, Trumpington; Robert Gee, Adel, both of England

[73] Assignee: National Research Development Corporation, London, England

[21] Appl. No.: 900,307

[22] Filed: Apr. 26, 1978

[30] Foreign Application Priority Data

Apr. 29, 1977 [GB] United Kingdom ............... 18045/77

[51] Int. Cl.² ............................................. C25B 1/00
[52] U.S. Cl. .................................................... 204/61
[58] Field of Search ................................ 204/60, 61

[56] References Cited

U.S. PATENT DOCUMENTS 4,085,023  4/1978  Fray .................................. 204/195 S Primary Examiner—Howard S. Williams
Attorney, Agent, or Firm—Cushman, Darby & Cushman

[57] ABSTRACT

Polycrystalline gallium beta-alumina is made by electrolyzing sodium beta-alumina using, as the anode, liquid gallium and liquid gallium chloride in contact with the beta-alumina.

21 Claims, No Drawings

METHOD OF MAKING METAL BETA-ALUMINA AND REFINING METAL USING IT

This invention relates to a metal-beta-alumina, in particular to the refining of that metal using it, and to a method of making polycrystalline metal-beta-alumina. The metal is most preferably gallium, but other metals (excluding alkali metals) could also be used, such as copper, silver, thallium and indium. The invention will, for convenience, be described principally in relation to gallium.

Turning first to the method of making polycrystalline gallium $\beta$-alumina, methods exist for making single crystals of this compound, but a massive polycrystalline object, such as a coherent disc of 2 mm thickness and 5 mm diameter, cannot be made reliably using these methods.

The present invention accordingly provides a method of making a polycrystalline metal-$\beta$-alumina, comprising electrolysing polycrystalline alkali-metal $\beta$-alumina, using as anode the liquid metal and a molten salt which contains ions of the metal, preferably monovalent ions, the molten salt being in contact with the $\beta$-alumina. The alkali metal is usually sodium. The molten salt may be the metal halide, usually the chloride; in the case of gallium this would be $GaCl_2$ which contains $Ga^+$ ions because, on melting, $2GaCl_2 \rightarrow Ga^+ + (GaCl_4)^-$.

In the method the liquid metal halide (e.g., chloride) may be used as cathode. A voltage is conveniently applied to the anode and/or cathode by way of a tungsten feeder member (e.g., a tungsten wire) in contact therewith. A convenient temperature range for the method especially for gallium is 300° C. to 350° C.

Thus, a preferred cell for performing the method may be represented as follows:

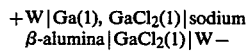
+W|Ga(l), GaCl$_2$(l)|sodium
$\beta$-alumina|GaCl$_2$(l)|W−

The method should be continued until a sufficiently large quantity of gallium has been passed from left to right in order completely to displace the sodium from the electrolyte. It appears that the molten $GaCl_2$ wets the $\beta$-alumina and also provides a source of $Ga^+$ ions (whereby to facilitate the reaction $Ga \rightarrow Ga^+ + e^-$) and (on the right-hand side) acts as a reservoir for the $Na^+$ ions displaced from the $\beta$-alumina.

The present invention extends to polycrystalline metal $\beta$-alumina made as set forth above, which may be in the form of a coherent article such as a disc or a tube, whose thickness and diameter may both exceed 1 mm.

Turning now to the refining of metal, it has been suggested to refine sodium by passing it through sodium $\beta$-alumina. The transport of sodium through sodium $\beta$-alumina is a well documented process, being a principal feature of the sodium-sulphur battery.

The invention therefore also provides a method of purifying impure metal comprising all the following steps (a) to (d), of which (a) to (c) can be in any order:
(a) Melt the impure metal together with at least enough of a salt which contains ions of the metal when molten.
(b) Place one side of a polycrystalline diaphragm of the metal-$\beta$-alumina in contact with the impure gallium.
(c) On the other side of the diaphragm place at least enough of a molten salt which contains ions of the metal. "Enough" in (a) and (c) means enough to wet the respective sides of the diaphragm.
(d) Make the one side of the diaphragm anodic with respect to the other side.

The diaphragm may be made by the foregoing method for polycrystalline metal $\beta$-alumina.

Preferably, the metal salt in step (a) and/or (c) contains monovalent ions of the metal, and may be a halide, for example gallium chloride $GaCl_2$, or it may be gallium iodide in either or both cases. In step (a), preferably the proportion of the metal salt is at least 1%, for example 2 to 6% by weight, while in step (c), preferably the amount per mm$^3$ of the metal salt is at least 3 mg, for example 4 to 15 mg. A convenient temperature range for the method is 300° C. to 350° C. The invention extends to metal (e.g., gallium) purified by this method.

When this is performed in relation to gallium in the absence of a molten salt, no measurable transport of gallium is observed at temperatures up to 800° C. and potentials up to 30 volts even after 7 days. In some cases breakdown of the diaphragm, or of the seals around it, eventually occurred. The presence of the molten gallium salt substantially reduces the interfacial resistance between liquid gallium and gallium $\beta$-alumina. Similar observations result from corresponding experiments wherein the metal is copper, silver or thallium for example.

The invention will now be described by way of example. Example 1 describes a method of making polycrystalline gallium $\beta$-alumina and Example 2 describes the refining of gallium.

EXAMPLE 1

A cylindrical disc or pellet of polycrystalline sodium $\beta$-alumina (5 mm diameter, 2 mm thick) was sealed into the end of a quartz pipe (5 mm bore, 50 mm long) so as to close that end.

This pipe was then transferred, closed end downwards, to an argon-filled dry-box. Meanwhile, 4 g of pure gallium were put in a heat-resistant glass test-tube (12 mm bore, 200 mm long) together with a small amount (100–200 mg) of $GaCl_2$. The same amount of $GaCl_2$ was put into the quartz pipe which was then passed downwards into the test-tube and then placed above the Ga+$GaCl_2$ in test-tube. Tungsten wires were positioned one inside the quartz pipe and one outside it but still inside the test-tube. At the top of the test-tube, suitable seals were made such that electrical connections could be made to the tungsten wires and an inert atmosphere could be maintained inside the apparatus.

The assembly was then removed from the dry-box and positioned in the hot zone of a vertical tube furnace. The Ga and $GaCl_2$ melted, and, as they are immiscible, the latter formed a layer over the former. The quartz pipe was pressed down into the melt by means of the inner tungsten wire. Hence, the $\beta$-alumina pellet acquired a surface coating of $GaCl_2$ (which, unlike Ga, wets $\beta$-alumina), thus ensuring good electrical contact between this melt and the $\beta$-alumina surface. A small flow of argon was passed through the apparatus during the experiment to prevent both oxidation of the gallium and hydrolysis of the salt.

A D.C. power pack and ammeter were connected in series across the tungsten wires to make the inner wire negative and the second wire positive. When the furnace temperature reached 350° C., a fixed potential of 1 volt was applied. The initial current was 1 mA, rising to 50 mA after 30 minutes, and 100 mA after 90 minutes.

At this point, a current limit of 100 mA was set. After 18 hours (overnight) most of the Ga from the test-tube had passed into the quartz pipe, breaking the electrical contact to the second wire. On removal from the apparatus, the quartz pipe was found to contain 3 g of Ga. It was still vacuum tight. As far as could be determined, the sodium in the pellet has been entirely displaced by the gallium, and the pellet accordingly now was a polycrystalline article of gallium $\beta$-alumina.

EXAMPLE 2

The quartz pipe closed at one end with the gallium $\beta$-alumina pellet, resulting from Example 1, was kept in an argon-filled dry-box. Meanwhile 3.5 g of an alloy were placed in a heat-resistant glass test-tube (12 mm bore, 200 mm long) together with a small amount (100–200 mg) of $GaCl_2$. The alloy was Ga—1 wt % Sn. The same amount of $GaCl_2$ (100–200 mg) was put into the quartz pipe, and thereafter the procedure was as in Example 1.

The temperature of the hot zone was 300° C. to prevent excessive volatilisation of the molten gallium chloride, a serious problem above 350° C. At a fixed potential of 1 volt, a current of 4 mA was obtained after about one hour. From this point, the current limit was increased in stages (maximum potential of 1.5 v) such that the total number of coulombs passed could be calculated. The current was stopped after 30 hours, at which time 100 mA were passing at 1 volt.

From the inside and outside of the quartz pipe 1.79 g and 1.55 g of gallium respectively were recovered. The remaining 0.16 g from the initial quantity of the alloy was lost as a deposit on various parts of the apparatus. The two quantities of gallium were dissolved in 100 ml of a 50% HCl solution. Chemcial analysis showed that the former contained less than 0.2 mg of Sn (the limit of analysis) or about 100 ppm, and the latter 38.9 mg, equivalent of 2.45 wt%. This latter quantity of 38.9 mg. accounts for the total amount of tin in the initial alloy.

The current density averaged out at 0.5 amps/cm$^2$ (500 A/square foot) and is quite satisfactory for a refining process for gallium.

The amount of transported gallium (as found by weighing) was 0.29 g less than that calculated from the amount of current passed. However, considering the errors involved, it is unlikely that this represents any significant loss of current efficiency, such as might arise from, for example, electronic conductivity in the beta-alumina.

Similar results have been obtained using gallium iodide.

In the case of copper, the copper salt used was CuCl, but a Cu(II) salt is not ruled out. Interfacial resistance falls, compared with when no Cu salt is present, by several orders of magnitude. In the case of silver, the salt $AgNo_3$ was successful. The invention extends to the special case of silver using the unexpected salt $PbCl_2$.

We claim:

1. A method of making a polycrystalline metal-$\beta$-alumina, comprising electrolysing polycrystalline alkali-metal $\beta$-alumina, using as anode the liquid metal and a molten salt which contains ions of the metal, the molten salt being in contact with the $\beta$-alumina.

2. A method as claimed in claim 1, wherein the metal any one of is copper, silver, thallium, indium and gallium.

3. A method as claimed in claim 1, wherein the alkali metal is sodium.

4. A method as claimed in claim 1, wherein the molten salt contains monovalent ions of the metal.

5. A method as claimed in claim 1, wherein the molten salt is the metal halide.

6. A method as claimed in claim 5, wherein the halide is chloride.

7. A method as claimed claim 1, wherein the cathode is a molten salt which contains ions of the metal.

8. A method as claimed in claim 1, wherein a voltage is applied to any of the anode and cathode by way of a tungsten feeder member in contact therewith.

9. A method of purifying an impure metal, comprising all the following steps (a) to (d) in any order of:
    (a) melting the impure metal together with at least enough of a salt which contains ions of the metal when molten;
    (b) placing one side of a polycrystalline diaphragm of the metal-$\beta$-alumina in contact with the impure metal;
    (c) placing on the other side of the diaphragm at least enough of a molten salt which contains ions of the metal to wet the respective sides of the diaphragm;
    (d) making the one side of the diaphragm anodic with respect to the other side.

10. A method as claimed in claim 9, wherein the metal salt in any of steps (a) and (c) contains monovalent ions of the metal.

11. A method as claimed in claim 9, wherein the metal salt in any of steps (a) and (c) is a halide.

12. A method as claimed in claim 11, wherein the halide is a chloride.

13. A method as claimed in claim 11, wherein the halide is an iodide.

14. A method as claimed in claim 9, wherein in step (a) the proportion of the metal salt is at least 1% by weight.

15. A method as claimed in claim 14, wherein said proportion is from 2 to 6% by weight.

16. A method as claimed in claim 9, wherein in step (c) the amount per mm$^3$ of the metal salt is at least 3 mg.

17. A method as claimed in claim 16, wherein said amount is from 4 to 15 mg.

18. A method as claimed in claim 9, wherein the temperature is 300° to 350° C.

19. A method as claimed in claim 9, wherein the impure metal is any one of copper, silver, thallium, indium and gallium.

20. A method of making polycrystalline silver-$\beta$-alumina, comprising electrolysing polycrystalline alkali-metal-$\beta$-alumina, using, as anode, liquid silver and molten $PbCl_2$, the molten $PbCl_2$ being in contact with the $\beta$-alumina.

21. The method of purifying impure silver, comprising all the following steps (a) to (d):
    (a) melting the impure silver together with at least enough $PbCl_2$;
    (b) placing one side of polycrystalline diaphragm of silver-$\beta$-alumina in contact with the impure silver;
    (c) placing on the other side of the diaphragm at least enough $PbCl_2$ to wet the respective sides of the diaphragm; and
    (d) making the one side of the diaphragm anodic with respect to the opposite side.

* * * * *